Figure 3:
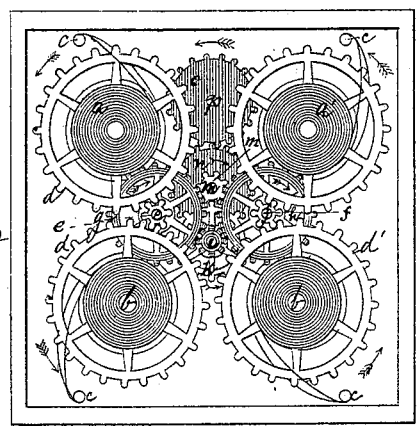

2 Sheets--Sheet 1.
W. FAY.
Combined Sewing-Machine Motors and Fans.
No. 150,142. Patented April 28, 1874.
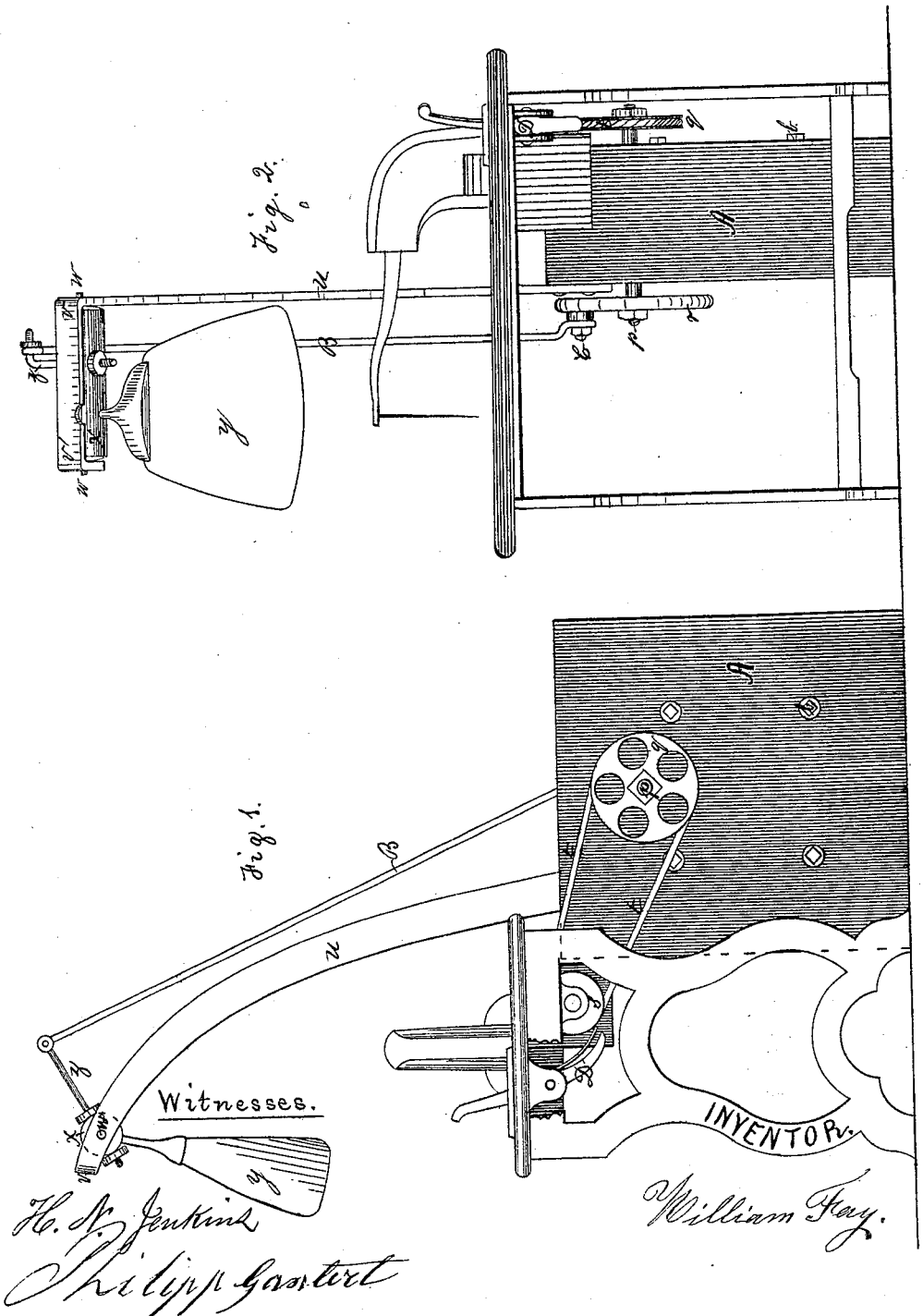

2 Sheets--Sheet 2.

W. FAY.
Combined Sewing-Machine Motors and Fans.

No. 150,142. Patented April 28, 1874.

WITNESSES.
J. C. Hubbell
J. J. Roach.

INVENTOR.
William Fay
Per H. N. Jenkins
Attorney

AM. PHOTO-LITHOGRAPHIC Co. N. Y. (OSBORNE'S PROCESS.)

UNITED STATES PATENT OFFICE.

WILLIAM FAY, OF NEW ORLEANS, LOUISIANA.

IMPROVEMENT IN COMBINED SEWING-MACHINE MOTORS AND FANS.

Specification forming part of Letters Patent No. 150,142, dated April 28, 1874; application filed October 25, 1873.

*To all whom it may concern:*

Be it known that I, WILLIAM FAY, of the city of New Orleans, parish of Orleans and State of Louisiana, have invented a new, useful, and Improved Mechanical Combination and Arrangement, whereby a sewing-machine and fan may be operated at one and the same time, motion being produced by the agency of spring-power, and transmitted, as will hereinafter be described; and I do hereby declare the following to be a full, clear, and exact description of the same, reference being had to the annexed drawing making a part of this specification, and on which—

Figure 1 is a side elevation, and Fig. 2 a front view, of a sewing-machine with my motive power and fan attachment. Fig. 3 is a view of the springs and gearing constituting the spring-power above referred to.

The nature of my invention will be better understood by describing my combination and the mode of arranging and operating the same.

My motive power is the same as that described in my application for "motive power for sewing-machines," filed July 21, 1873; and consists of eight volute springs, $a$ $a'$, &c., placed in pairs on the shafts $b$ $b'$, &c., and to which their inner ends are secured, while their outer extremities are fastened to the bars $c$ $c'$, &c. Upon the shafts $b$ $b'$, &c., and between each pair of springs, are rigidly secured ratchet-wheels, (not shown on the drawing,) and which, when the springs are wound up, engage their respective spur-wheels $d$ $d'$, &c., by means of pawls operated by springs in the usual manner. One end of each of the four shafts $b$ $b'$, &c., is made to project outside the casing A. These ends are filed square, and fitted with a key for the purpose of winding up the springs.

When in motion the spur-wheels $d$ $d'$, &c., engage the respective pinions $e$ and $f$, and upon the shafts of these pinions are also keyed the cog-wheels $g$ and $h$, both which gear into the pinion $i$. Upon the shaft of the said pinion is fitted the toothed wheel $k$, which, in turn, engages the pinion $m$. The wheel $n$, being on the same shaft with the said pinion $m$, in turn gives motion to the wheel $o$, and consequently the shaft $p$, the ends of which project outside the casing. To one of these ends is keyed the pulley $q$, while on the other end is secured the wheel $r$.

This motive power is incased in a neat box, and is placed in the rear of the sewing-machine, as is clearly shown on the drawings. The wheel or pulley $q$ of the motive power being aligned with the small pulley $s$ of the sewing-machine, the two are connected by a belt or cord, $t$, by means of which motion is imparted from the one to the other.

The fanning apparatus is supported over the head of the operator by means of a curved standard, $u$, the lower end of which is secured by screws, or in any other suitable manner, to the side of the motive-power case, while the upper part is bent, as shown at $v$ $v'$, in order to provide bearings for the journals $w$ of the rock-shaft $x$, to which the fan $y'$ is attached. The rock-shaft is provided with a crank, $z$, the end of which is connected with the motive power by means of the connecting-rod B, to one end of which it is attached. The opposite end of the said rod B is secured to the wrist C of the wheel $r$.

In order to regulate the speed of the machine I employ a double friction-brake, D, the lighter part of which, being made to impinge upon the face of the pulley $s$, slackens the speed of the same, and by bringing the heavier part of the brake to bear upon the lighter, the machine may be easily and quickly stopped. The handle or upper part of the brake passes up through the table of the sewing-machine, and also through a slotted metal plate which is secured to the top of the said table. In the slot of the said plate the brake-lever is allowed to work back and forth. In one side of the slot is a number of notches, into which the lever may rest, and thus hold the brake in any desired position.

By my present combination and arrangement, it will be perceived that I dispense entirely with the treadle and fly-wheel shafts of the sewing-machine, and hence avoid the annoyance of having the machine stop on the center, besides economizing considerable power that would otherwise be lost in friction.

Having described my improvement, what I claim as new, and desire to secure by Letters Patent, is—

In combination with a sewing-machine operated by a clock-work mechanism, as herein described, the fan, standard, shaft, and connecting-rod, when constructed and arranged substantially as specified.

WILLIAM FAY.

Witnesses:
PHILIPP GANTERT,
H. N. JENKINS.